United States Patent
Kent et al.

[11] Patent Number: 5,934,621
[45] Date of Patent: Aug. 10, 1999

[54] BATCHED OPTIMIZED METHOD FOR TRANSFER ORBIT CONSTRUCTION

[76] Inventors: Stan Kent, 211 Yacht Club Way #330, Redondo Beach, Calif. 90277; Tania M. Ventura, 3649 Emerald St., Torrance, Calif. 90045; Jacqueline V. Hoang, 20703 Tomlee Ave., Torrance, Calif. 90503; Craig A. Langenfeld, 3184 E. Millbrae La., Gilbert, Ariz. 85234

[21] Appl. No.: 08/947,070
[22] Filed: Oct. 8, 1997
[51] Int. Cl.$^6$ ........................................... B64G 1/40
[52] U.S. Cl. .......................... 244/172; 244/55; 244/135 R
[58] Field of Search ........................... 244/135 R, 135 C, 244/172, 169; 702/55

[56] References Cited

U.S. PATENT DOCUMENTS

| | | | |
|---|---|---|---|
| 3,389,602 | 6/1968 | Clemens | 244/135 R |
| 4,898,030 | 2/1990 | Yeh | 244/135 R |
| 4,908,776 | 3/1990 | Crill et al. | 702/55 |
| 5,064,153 | 11/1991 | Gindre et al. | 244/172 |
| 5,071,093 | 12/1991 | Perdu | 244/135 R |
| 5,383,359 | 1/1995 | Challoner et al. | 702/55 |

*Primary Examiner*—Charles T. Jordan
*Assistant Examiner*—Charles R. Ducker, Jr.
*Attorney, Agent, or Firm*—Terje Gudmestad; Georgann Grunebach; Michael W. Sales

[57] ABSTRACT

A method and system for use as a modeling tool accurately estimates propellant remaining aboard a spacecraft at the completion of a transfer orbit by iterating mass flowrate in a linear optimized fashion until the difference between a predicted $\Delta V$ and observed $\Delta V$ is minimized. Actual flight pressure telemetry data is used to calculate a corresponding mass flowrate which must have been produced by a liquid apogee motor (LAM) for the spacecraft to reach the desired position. A thruster specific impulse value (ISP) is derived from ground test data to allow computation of the amount of propellant consumed during transfer orbit. When this value is subtracted from the known initial propellant load, the propellant remaining at the beginning of life (BOL) of a satellite can be calculated.

10 Claims, 2 Drawing Sheets

Microfiche Appendix Included
(3 Microfiche, 147 Pages)

BATCHED OPTIMIZED METHOD FOR TRANSFER ORBIT CONSTRUCTION

TECHNICAL FIELD

The present invention generally relates to calculation of propellant remaining in a spacecraft after attaining transfer orbit, and more specifically to an improved method of predicting remaining propellant to facilitate more accurate spacecraft life remaining calculations.

BACKGROUND ART

Estimation of remaining propellant of a spacecraft at the beginning of life (BOL) or at the end of the transfer orbit, i.e., injection into geostationary orbit, has been generally carried out using a bookkeeping method. More specifically, this method primarily models mass flowrate by estimating flow coefficients from liquid apogee motor (LAM) ground test data. These coefficients are determined using a regression analysis on data collected during LAM acceptance testing. The coefficients are then used in a set of equations which relate mass flowrate to supply pressure so that the only remaining unknowns are chamber pressure, oxidizer mass flowrate and fuel mass flowrate.

The three unknown parameters are then determined by an iterative process which starts with an initial guess for the oxidizer mass flowrate. One equation is used to determine an initial chamber pressure. A second equation is used to determine the corresponding fuel mass flowrate. This fuel mass flowrate is then used in a third equation to determine a second chamber pressure. The first and second chamber pressures are compared and if they are not equal within a certain tolerance, the process is repeated. The oxidizer and fuel mass flowrates corresponding to the converged solution are then used in conjunction with the total engine firing time to determine total propellant consumption during transfer orbit.

This technique has several disadvantages. A conservative analysis indicates that the uncertainty in mass flowrate associated with this technique is at best approximately 2%. The large uncertainty is mainly associated with the fact that the chamber pressure is not known. The three equations used in the method are based on both laminar and turbulent pressure drop relations. This is done for modeling convenience, but it is a physical impossibility. The parameters used in the bookkeeping method are unobservable.

As an example of the above problem, one known type of satellite features an integrated propulsion subsystem that utilizes the same set of propellant tanks for transfer orbit as for on-orbit stationkeeping. Approximately 80% (~3000 lb) of the total propellant is consumed during the transfer orbit. The above-noted modeling uncertainty of the mass flow through the transfer orbit LAM is estimated as 2–3% to account for all potential error sources from ground instrumentation during acceptance testing to in-flight telemetry. As noted above, the largest factor in causing this uncertainty is the fact that the chamber pressure of the satellite thruster is not directly known, but rather is inferred from inlet pressure correlations. Thus, because the modelling uncertainty requires the need to include for a 2–3% error factor in predicting remaining amount of propellant, this results in the need to reduce the propellant prediction by 60–90 lbs of propellant, or 1–1.5 years of satellite life.

Clearly, the bookkeeping prediction method has an inherent worst case "knowledge penalty." In other words, a spacecraft may indeed contain more propellant than conservative bookkeeping suggests, but known techniques simply are not able to provide a more accurate calculation. As a result, an operator must plan to deorbit a satellite when bookkeeping predicts 1–1.5 years of remaining life. Thus, a need exists for a method which more reliably predicts remaining propellant in a spacecraft after attaining transfer orbit.

DISCLOSURE OF THE INVENTION

It is, therefore, an object of the present invention to provide an improved method and system for estimating remaining propellant of a spacecraft after attaining transfer orbit so that remaining spacecraft life can be more reliably predicted.

It is another object of the present invention to provide an improved method,and system for estimating remaining propellant of a spacecraft after attaining transfer orbit which matches actual LAM performance and observable velocity change data ($\Delta V$) to provide improved error certainty.

In accordance with these and other objects, the present invention provides a method and system for estimating or predicting an amount of propellant remaining in a spacecraft after attaining a geostationary orbit which utilizes a fixed value for a thruster specific impulse value (Isp) imparted by a LAM equal to a ground test value measured during typical LAM acceptance testing. Mass flowrate is then iterated with the fixed Isp until a calculated $\Delta V$ is obtained within a predetermined range or error boundary of a measured $\Delta V$. The iterated mass flow rate is then utilized to predict remaining propellant in the space craft.

In further accordance with the present invention, telemetered in-flight tank pressure data is processed to calculate an estimated chamber pressure in the LAM to provide an initial mass flow prediction for the iterative process. A processor in a processing subsystem is programmed to perform the mass flow iterations by adjusting a flowrate calibration factor whenever $\Delta V$ does not matches the measured $\Delta V$ of the spacecraft. In effect, the pressure drop through the spacecraft propulsion subsystem is adjusted to derive an accurate determination of mass flow.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
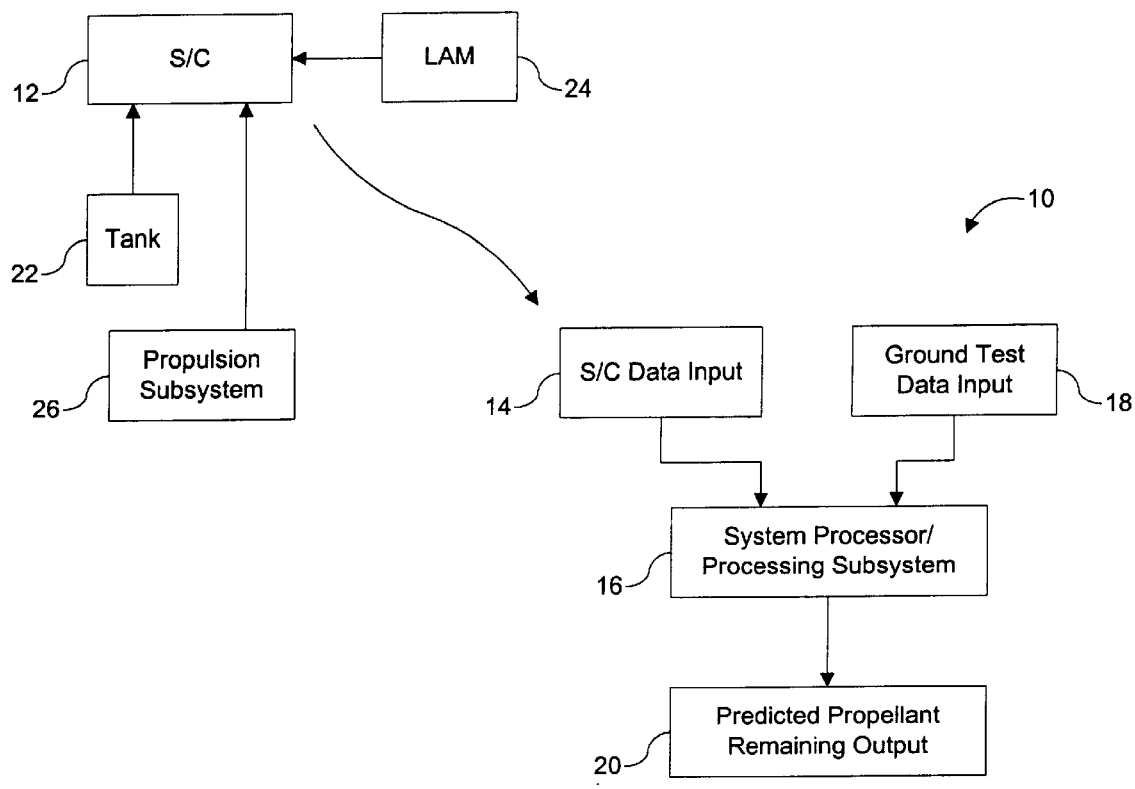
FIG. 1 is a block diagram of a system for estimating remaining propellant in a spacecraft after transfer orbit maneuvers in accordance with the present invention.

Referring to FIG. 1, a basic block diagram shows a system 10 in accordance with the present invention for estimating propellant remaining in a spacecraft 12, such as a satellite, after transfer orbit maneuvers have been completed. System 10 includes an input 14 for a processor in a processing subsystem 16 which receives in-flight spacecraft data, and an input 18 for receiving typical ground acceptance test data. Processing subsystem generates an estimate output in any suitable format at box 20. As shown, the spacecraft generally includes a liquid propulsion subsystem comprising a propellant tank 22, a LAM 24, and a propulsion/thruster subsystem 26. It is noted that the structural details of system 10 do not constitute a part of the present invention, and as such, the system may be implemented utilizing any suitable hardware and hardware configuration arranged to implement the process described below.

Estimating the amount of propellant used during LAM burns is necessary in order to estimate the amount of remaining propellant and thus the estimated satellite life. In order to determine the amount of propellant used, it is necessary to know both the Isp and the mass flow achieved during the LAM burns. Because these quantities are not measured directly in-flight, it is necessary to reconstruct them based on ground test data and observable in-flight data (i.e., reconstructed $\Delta V$ from ranging data).

For a burn of length L seconds starting at time a, we have by definition:

$$\Delta V = \int_a^{a+L} a(t)dt$$
$$= \int_a^{a+L} \frac{F(t)}{m(t)} dt$$
$$= \int_a^{a+L} \frac{Isp(t) \times \dot{m}(t) \times g}{m(a) - \int_a^t \dot{m}(u)du} dt$$

Figure 2:
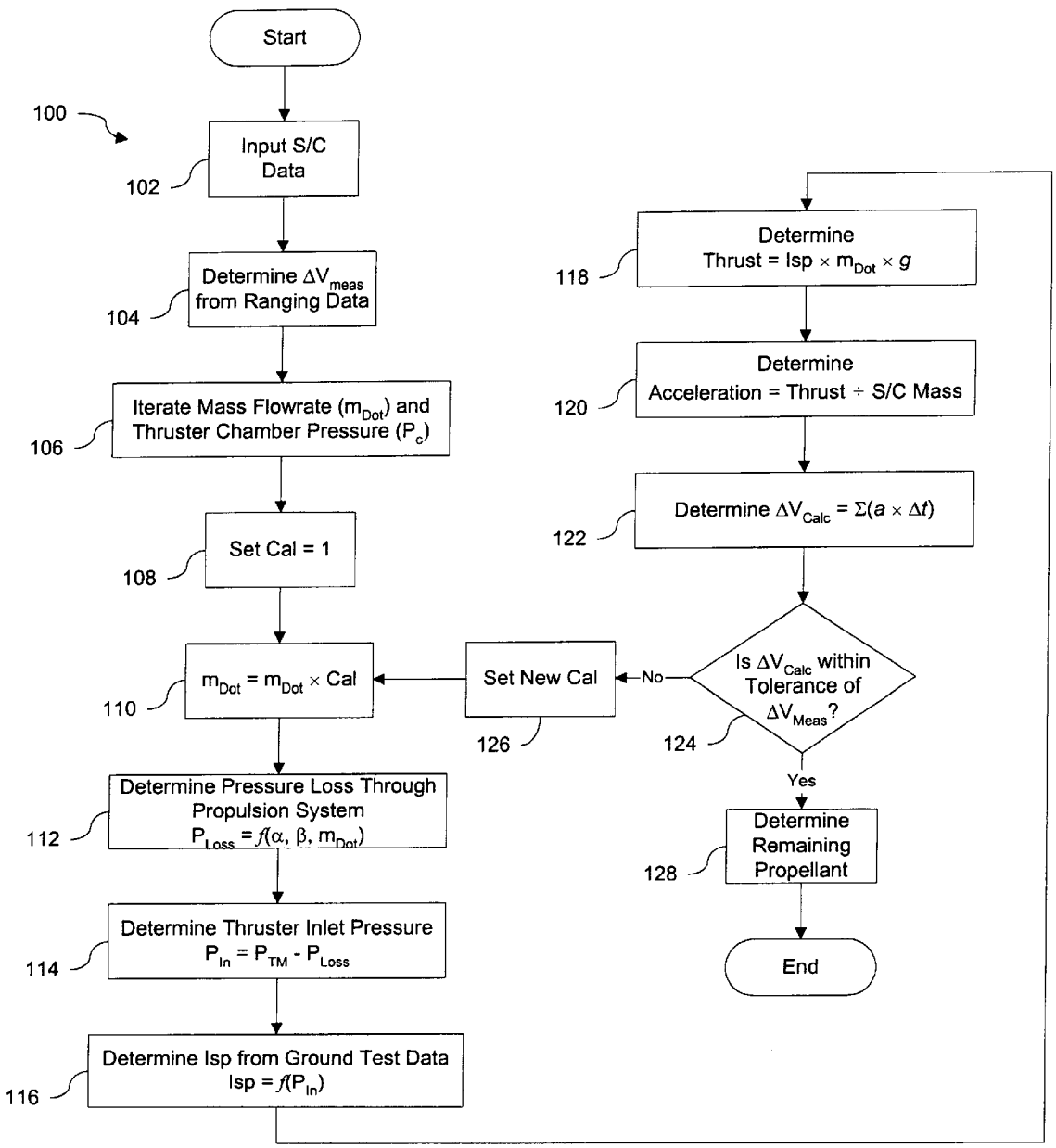
FIG. 2 is a flowchart illustrating the method of estimating/predicting remaining propellant in a spacecraft after transfer orbit maneuvers in accordance with the present invention.

As described more fully in connection with the flow chart of FIG. 2, the present invention provides a method 100 for estimating an amount of propellant remaining in spacecraft 12 after completion of transfer orbit maneuvers. The method particularly involves "batch-optimized" processing of a flight measured velocity change ($\Delta V$) and a fixed specific impulse (Isp) determined during routine ground acceptance tests.

In reconstructing transfer orbit propellant consumption, the present invention takes advantage of the fact that in-flight performance of the LAM 24 will be the same as ground performance.

More specifically, mass flowrate is allowed to vary in a linearly optimized fashion until the difference between a predicted $\Delta V$ and an observed or measured $\Delta V$ is minimized. Actual flight pressure and temperature telemetry is used to determine the mass flowrate produced by the LAM in attaining the desired spacecraft orbit/position. More precisely, telemetered tank pressures are used to calculate an estimated chamber pressure and a corresponding initial mass flow prediction. Iterations on the mass flow are then made until the calculated burn $\Delta V$ matches the measured $\Delta V$. As noted previously, this arrangement in effect adjusts the pressure drop through the propulsion subsystem to arrive at an accurate calculation for mass flow, thereby removing the largest source of error encountered in a typical prior art bookkeeping estimate.

Before describing method 100, the relevant terms are defined as follows:

$P_{TM}$: tank pressure telemetry data.
$P_C$: thruster chamber pressure.
$P_{LOSS}$: pressure loss through propulsion system.
$P_{IN}$: thruster inlet pressure.
CAL: mass flowrate calibration factor.
$m_{DOT}$: mass flowrate.
$\Delta V_{CALC}$: delta velocity calculated for each LAM burn.
$\Delta V_{MEAS}$: delta velocity obtained from ranging data of orbital operations.

Referring now to FIG. 2, at block 102 relevant in-flight spacecraft input data is received. At block 104, $\Delta V_{MEAS}$ is determined. Then at block 106, $m_{DOT}$ and $P_C$ are iterated to solve for each factor based on the relationship $m_{DOT}=f(P_{TM}, P_C)$ and $P_C=f(m_{DOT})$. As shown at block 108, CAL is set to an initial value equal to 1, and $m_{DOT}$ is generated as $m_{DOT}=m_{DOT}*CAL$ at block 110.

Then, as shown at block 112, pressure loss through the propulsion subsystem is determined as $P_{LOSS}=f(alpha$ and beta from tanks to inlet, $m_{DOT})$, where alpha and beta are flow loss coefficients. At block 114, thruster inlet pressure $P_{IN}$ is determined by $P_{TM}-P_{LOSS}$. As shown at block 116, a fixed value for thruster Isp is then determined as a function of inlet pressure from curve-fits of ground test data.

After Isp is determined, thrust is determined at block 118 as a function of Isp and the current estimate for $m_{DOT}$, i.e., $Isp*m_{DOT}*g$. Acceleration is determined at block 120 as thrust/mass of the spacecraft, after which $\Delta V_{CALC}$ is determined at block 122 by integrating the acceleration. At block 124, $\Delta V_{CALC}$ is compared to $\Delta V_{MEAS}$, and if it is not within a predetermined tolerance or error range (as discussed in more detail below), a new value for CAL is set at block 126 and the process repeats at block 110. Otherwise, at block 128 the amount of remaining propellant is determined by applying CAL to all LAM burns which occurred during the transfer orbit maneuvers.

As a result, the mission is reconstructed utilizing ground test data (Isp and mass flowrate) and observable in-flight data (i.e., reconstructed $\Delta V$ from ranging data). Setting a fixed Isp based on ground performance and allowing mass flowrate to vary results in a mass flow estimate which is not particularly sensitive to the initial choice of Isp. As an example, an estimated standard deviation for Isp can be 0.9 seconds, which translates into a difference of about 2.5 kilograms in propellant, or approximately one month of satellite life. Even a three standard deviation (i.e., three sigma error) difference between actual in-flight Isp and ground Isp—a very large difference by statistical standards—would translate into a difference of about 7.5 kilograms, or three months of satellite life.

The error in total mass flow also depends on errors in $\Delta V$. The effect of these errors can be seen by noting that $$\dot{m} \simeq \frac{m(a)\Delta V}{g \times L \times Isp}$$

and that the total mass consumed is thus roughly $$m \simeq \frac{m(a)}{g \times Isp} \Delta V.$$

In other words, the total mass consumed is approximately proportional to $\Delta V$, so the standard deviation in the total mass flow is proportional to the standard deviation of $\Delta V$. As an example, a three-sigma error for $\Delta V$ at the end of a mission can be about 10 m/s. Because a typical mission has about three LAM burns, the three-sigma error for each LAM burn is approximately $10/\sqrt{3} \approx 5.8$ m/s. Thus, as an example, if a spacecraft mass m(a) is approximately 2800 pounds, and the Isp is approximately 300, the factor $$\frac{m(a)}{g \times Isp}$$

is about 0.95. It follows that the three-sigma error in total mass flow based on errors in ΔV is no more than 5.8 kilograms.

While three sigma error factors for Isp and ΔV provide an acceptable range when considered individually, the preferred embodiment is not tailored to be that conservative. More specifically, it is unlikely that the three-sigma error for total mass flow would be the sum of the three-sigma error for using ground Isp and the three-sigma error for measurement error in ΔV. In other words, the chance that there would be both a three-sigma error in the Isp and a three-sigma error in ΔV is far beyond a normal three-sigma limit.

Thus, the preferred embodiment employs a more realistic estimate for the total error as a two-sigma error for Isp and a two-sigma error in ΔV. By this estimate, the total error when estimating mass flow is 5.0 kilograms plus 3.87 kilograms, or a total of 8.87 kilograms. This estimate is itself probably conservative, since the chance of two-sigma errors is much less than the chance of a single three-sigma error.

It should be noted that the method of fixing Isp and using mass flow as the only varying parameter does not reflect the effect of physical phenomena such as off-nominal mixture ratios on Isp. Thus, the preferred embodiment utilizes both two sigma error factors when determining a tolerance range, i.e., error bounds, since the conservatism introduced by using the two-sigma errors somewhat compensates for phenomena not otherwise included in the model.

Other factors which can be considered during the modeling of the present invention include coning losses (i.e., wobble), four-burn cases versus three-burn cases, and the inclusion of smaller burns. These factors are generally of a second order effect on the calculation of the mass flow calibration and provide further refinement of the calculation.

It will be understood that the present invention is generally applicable to any spacecraft using liquid propulsion systems for transfer orbit, such as axis stabilized or spin-stabilized spacecraft.

Therefore, while the best mode for carrying out the invention has been described in detail, those familiar with the art to which this invention relates will recognize various alternative designs and embodiments for practicing the invention as defined by the following claims.

What is claimed is:

1. A method for estimating propellant remaining in a spacecraft after the spacecraft has attained a transfer orbit, said spacecraft having a liquid propulsion subsystem, said method comprising:

receiving in-flight liquid propulsion subsystem data;

determining a measured change in velocity based on input ranging data;

generating an initial value for mass flowrate;

determining a fixed specific impulse value based on input ground acceptance test data;

determining a calculated change in velocity based on the fixed specific impulse value and the initial mass flowrate;

comparing the calculated change in velocity to the measured change in velocity;

adjusting the mass flowrate value and determining a new calculated change in velocity if the prior calculated change in velocity is not within a predetermined range of the measured change in velocity; and estimating the remaining amount of propellant based on the current mass flowrate value if the current calculated change in velocity is within the predetermined range.

2. The method of claim 1 wherein generating an initial mass flowrate value is based on received tank pressure telemetry data and an adjustable calibration value.

3. The method of claim 1 wherein the specific impulse is generated as a function of a thruster inlet pressure input from said ground acceptance test data.

4. The method of claim 1 further comprising:

receiving data representative of the total duration of propulsion subsystem burns during transfer orbit maneuvers;

determining the amount of propellant used during the transfer orbit burns as a function of the duration of burns and the last generated mass flowrate; and subtracting the determined amount of propellant used from an initial propellant load value.

5. The method of claim 1 further comprising estimating a likely duration of life of the spacecraft based on the estimated remaining amount of propellant.

6. A system for estimating propellant remaining in a spacecraft after the spacecraft has attained a transfer orbit, said spacecraft having a liquid propulsion subsystem, said system comprising:

a first input for receiving in-flight liquid propulsion subsystem data;

a second input for receiving ground acceptance test data; and a processing subsystem connected to said first and second inputs and operative to: determine a measured change in velocity based on input ranging data, generate an initial value for mass flowrate based on data received by said first input, determine a fixed specific impulse value based on data received by said second input, determine a calculated change in velocity based on the fixed specific impulse value and the initial mass flowrate, compare the calculated change in velocity to the measured change in velocity, adjust the mass flowrate value to determine a new calculated change in velocity if the prior calculated change in velocity is not within a predetermined range of the measured change in velocity, and estimate the remaining amount of propellant based on the current mass flowrate value if the current calculated change in velocity is within the predetermined range.

7. The system of claim 6 wherein said processing subsystem is further operative to generate an initial mass flowrate value based on tank pressure telemetry data received at said first input and an adjustable calibration value.

8. The system of claim 6 wherein the processing subsystem generates said specific impulse as a function of a thruster inlet pressure received by said second input.

9. The system of claim 6 wherein said first input is operative to receive data representative of the total duration of propulsion subsystem burns during transfer orbit maneuvers, and said processing subsystem is further operative to determine the amount of propellant used during the transfer orbit burns as a function of the duration of burns and the last generated mass flowrate, and subtracting the determined amount of propellant used from an initial propellant load value.

10. The system of claim 6 wherein said processing subsystem is further operative to estimate a likely duration of life of the spacecraft based on the estimated remaining amount of propellant.

* * * * *